United States Patent [19]

Sugasawara

[11] 4,130,621
[45] Dec. 19, 1978

[54] METHOD FOR MANUFACTURING A DOOR CATCH MADE OF A SYNTHETIC RESIN

[75] Inventor: Seiji Sugasawara, Chiba, Japan

[73] Assignee: Sugatsune Industrial Co., Ltd., Chiba, Japan

[21] Appl. No.: 872,799

[22] Filed: Jan. 27, 1978

[30] Foreign Application Priority Data

Jan. 31, 1977 [JP] Japan .................................. 52-9454

[51] Int. Cl.² ...................... B29C 27/00; B29C 27/30
[52] U.S. Cl. ..................................... 264/230; 29/447; 264/249; 264/294; 264/320
[58] Field of Search ............... 264/230, 249, 294, 320; 29/447, 505, 453

[56] References Cited

U.S. PATENT DOCUMENTS

| | | | |
|---|---|---|---|
| 3,414,118 | 12/1968 | Jacobson | 264/230 |
| 3,497,952 | 3/1970 | King et al. | 264/230 |
| 3,711,134 | 1/1973 | Goldberg | 29/453 |

*Primary Examiner*—W.E. Hoag
*Attorney, Agent, or Firm*—George B. Oujevolk

[57] ABSTRACT

A method for manufacturing a door catch including a main body made of a thermoplastic resin, and a magnet board for attracting a piece to-be-attracted of a door, wherein supports and a leg portion which constitute the main body are integrally molded of the resinous material under the state under which the spacing between the upper parts of the supports is expanded so as to permit the magnet board to be inserted therebetween, and wherein the magnet board is fixed between the supports owing to the shrinkage of the resinous material at the time of cooling thereof.

4 Claims, 4 Drawing Figures

METHOD FOR MANUFACTURING A DOOR CATCH MADE OF A SYNTHETIC RESIN

BACKGROUND OF THE INVENTION

This invention relates to a method for manufacturing a door catch made of a synthetic resin.

A door is sometimes held in the open state, thereby to facilitate the ventilation of a room or to make it convenient to carry in or out a load at an entrance and exit. In order to hold the door open, a door catch 2 as shown by way of example in FIG. 1 has heretofore been used. The door catch 2 including a magnet board 3 is fixed onto, for example, a wall of a building 1. A piece to-be-attracted 4' of a door 4 is attracted to the magnet board 3.

As shown in FIG. 2, the door catch 2 comprises a proper or main body a formed of a leg portion 5 which is mounted on, for example, the wall of the building, and supports 6 and 6' which are juxtaposed as branches on the upper end of the leg portion 5. Between the supports 6 and 6' which are protrusively provided with mounting arbors 7 and 7' in opposition to each other, respectively, the magnet board 9 which is penetratingly formed with a mounting hole 8 is held and fixed in such a way that the mounting arbors 7 and 7' are snugly fitted in the mounting hole 8 in opposition to each other.

In actually fabricating such a door catch, the magnet board 9 must be held between the mounting arbors 7 and 7' in snug fit. Therefore, if the proper a is integrally formed in advance, the magnet board 9 cannot be attached. Accordingly, it has heretofore been inevitable to form split half parts b and b' which are so shaped that the proper a is divided horizontally, to interpose the magnet board 9 between the supports 6 and 6', and to integrally join both the members with a bonding agent or the like. In case of making the proper a of a synthetic resin, the left and right split half parts b and b' must be separately molded as described above, and the operation of forming the integral proper a by bonding, fusion or any other means after sandwiching the magnet board 9 between the split half parts is indispensable, so that the enhancement of the efficiency of the job cannot be expected at all. The inferior productivity inevitably leads to a high cost. Moreover, a joint inevitably arises in the proper a, and hence, a burring or polishing operation is accompanied. Since the joint appears in the surface, the design as an article of commerce is not always satisfactory.

SUMMARY OF THE INVENTION

The inventor made various studies in view of the difficulties mentioned above, and has developed a method for manufacturing a door catch made of a synthetic resin.

An object of this invention is to provide a manufacturing method capable of fabricating a door catch of a synthetic resin highly efficiently.

According to this invention, there is provided a method for manufacturing a door catch made of a synthetic resin wherein right and left supports and a leg portion are integrally molded under the state under which the spacing between upper parts of both the supports are previously expanded so as to permit a magnet board to be sandwiched in and wherein the property of the synthetic resin that it shrinks at the time of cooling is effectively exploited for attaching the magnet board.

DESCRIPTION OF THE PREFERRED EMBODIMENT

Figure 1:
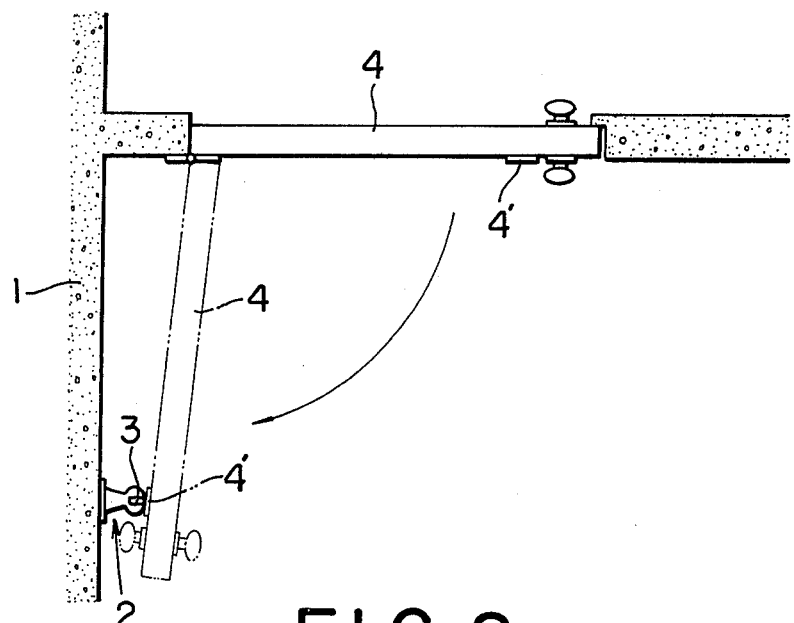
FIG. 1 is a plan view which shows an example of use of a door catch.
Figure 2:
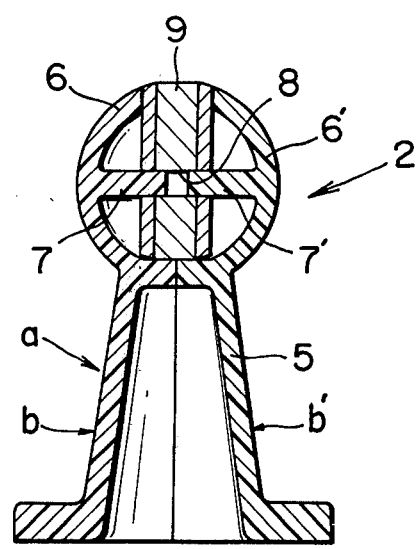
FIG. 2 is a vertical sectional front elevation of the door catch formed by a known method of manufacture.
Figure 3:
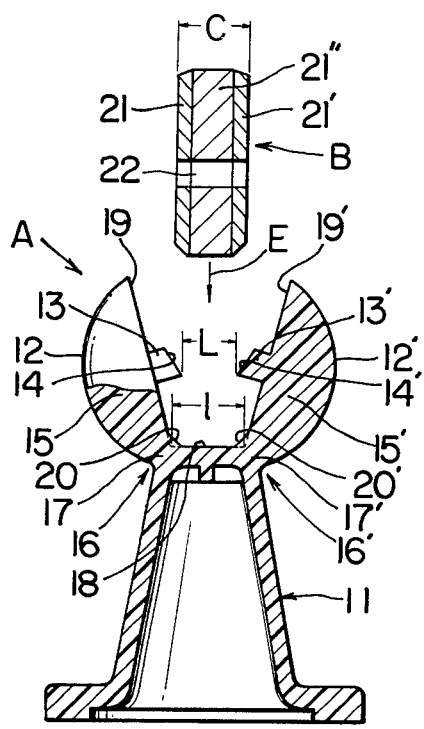
FIG. 3 is a vertical sectional front elevation which shows a molded shape of a proper of a door catch in the method of manufacture according to this invention, together with a magnet board.
Figure 4:
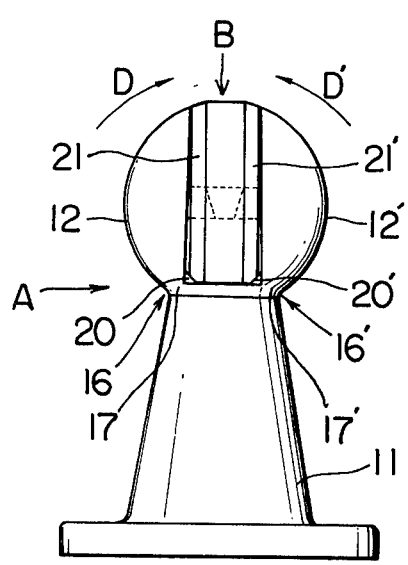
FIG. 4 is a front elevation of the door catch formed by the method for manufacturing it.

FIGS. 3 and 4 illustrate an embodiment of this invention. As shown in FIG. 3, a proper A of a door catch is formed in such a way that a hollow leg portion 11 which is mounted on, for example, a wall of a building and left and right semispherical supports 12 and 12' which serve to horizontally sandwich and mount a magnet board B are appropriately and integrally molded of a thermoplastic synthetic resin. Both the supports 12 and 12' are molded continuously to the upper end of the leg portion 11, and mounting arbors 13 and 13' are formed in a manner to be integral with the respective supports 12 and 12', to protrude from the opposing end faces of the supports and to oppose to each other. The spacing between the left and right supports 12 and 12' is as stated below. The spacing l between lower parts of the supports corresponds to the width C of the magnet board B. The spacing between the supports is gradually expanded from the lower parts towards upper parts of the supports. At least the spacing L between the mounting arbors 13 and 13' is made greater than the width C so as to permit the magnet board B to be sandwiched in. The interval L may be equal to or s smaller than the width C insofar as the magnet board B can be pushed in.

In order to facilitate the operation of sandwiching the magnet board in between the mounting arbors 13 and 13', it is desirable that the end faces of the mounting arbors are made slant surfaces 14 and 14' which incline and expand outwards from the lower ends to the upper ends thereof as shown in the figure.

The left and right supports 12 and 12' are substantially semispherical, respectively. The central parts of the supports are molded into the thickest parts 15 and 15'. The base ends 16 and 16' continuous to the leg portion 11 are formed into thin parts 17 and 17' thinner than the thick parts 15 and 15' so that the parts 17 and 17' may be flexible and deformable at the time of cooling to be described later.

In molding the proper A, overlay parts 20 and 20' are integrally molded in the shape of diagonal bracing at inner corner parts which correspond to the inner faces of the base ends 16 and 16' of the left and right supports 12 and 12' and which are defined between the upper end face 18 of the leg portion 11 and the inner faces 19 and 19' of the respective supports 12 and 12' intersecting with the end face 18 at obtuse angles.

The magnet board B is formed in such a manner that metal plates 21 and 21' made of a magnetic substance having the same shape as that of a magnet 21'' are attracted together on both sides of the magnet 21'' and that a mounting hole 22 corresponding to the mounting arbors 13 and 13' is penetratingly provided.

At the time when, after integrally molding the proper A of the thermoplastic synthetic resin as described above, remaining heat at the molding exists in the resinous material sufficiently yet, the magnet board B is pushed in as indicated by arrow E in FIG. 3 and is sandwiched between the left and right supports 12 and 12' with the mounting hole 22 facing the respective mounting arbors 13 and 13'. Thereafter, natural cooling or forced cooling is carried out. Then, the overlay parts 20 and 20' which are disposed so as to join the inner faces 19 and 19' of the supports 12 and 12' and the upper end face 18 of the leg portion 11 shrink, with the result that the inner faces 19 and 19' of the supports and the upper end face 18 both side ends of which are molded continuously thereto are drawn to each other. Therefore, the supports 12 and 12' are erected and have their spacing lessened in such a way that the base ends 16 and 16' of the respective supports 12 and 12' are flexed and deformed in the directions opposing to each other, that is, as indicated by arrows d and d' in FIG. 4 so as to diminish the obtuse angles between the upper end face 18 of the leg portion 11 and the supports 12 and 12'.

Accordingly, the mounting arbors 13 and 13' are engaged and fitted into the mounting holes 22 from the left and right, respectively, and the magnet board B is sandwiched between the left and right supports 12 and 12' and is fixed integrally with the proper A. Thus, the door catch is finished.

Of course, the overlay parts 20 and 20' are expanded and inclined outwards so that the supports 12 and 12' molded in advance may perform the shrinkage necessary for vertically deforming and erecting their inner faces 19 and 19'.

Since the supports 12 and 12' are molded continuously to and integrally with the upper end of the leg portion 11 at the base ends 16 and 16' put into the thin parts 17 and 17', the base ends 16 and 16' are easily flexed and deformed owing to the cooling and shrinkage of the overlay parts 20 and 20' so that the supports 12 and 12' may be erected.

Accordingly, after the molding of the proper A, the magnet board B can be attached to the proper A by utilizing the property of the synthetic resin without applying any special artificial means.

In the door catch manufactured in this way, the magnet board B is not forcibly and pressedly fitted into the proper A, and the proper A is integrally molded. therefore, the action of an unreasonable force on the proper A at the time of the attachment of the magnet board B is avoided, so that damages such as cracks do not occur.

As set forth above, according to the method of this invention for manufacturing a door catch, in manufacturing the door catch made of a synthetic resin in which the left and right supports 12 and 12' respectively protrusively provided with the mounting arbors 13 and 13' in opposition to each other are disposed on the upper end of the leg portion 11 and in which the magnet board B is attached between both the supports 12 and 12', the proper is integrally molded of the thermoplastic synthetic resin, and the overlay parts are disposed in suitable places at this time, whereby the magnet board B is sandwiched owing to the resinous property of the shrinkage at the cooling. Therefore, as compared with the prior-art method of manufacture wherein the right and left split half parts of the proper are molded and are thereafter joined into the integral form with the magnet board inserted therebetween, the method of this invention considerably relieves the manufacturing process, and hence, the door catch can be fabricated very efficiently. Simultaneously, since quite no joint appears in the body A, the catch which is excellent also in design can be manufactured at low cost.

What is claimed is:

1. A method for manufacturing a door catch made of a synthetic resin, comprising:
    forming a support member by molding right and left support elements and a leg portion of said member integrally by the use of a shrinkable thermoplastic synthetic resin, said right and left support elements having mounting arbors, for a magnet board for attracting and holding a door, protruding therefrom and opposed to each other, base ends of said support elements being continuous to an upper end of said leg portion, lower parts of the opposing support elements being made a spacing corresponding to a thickness of said magnet board; expanding upper parts of said opposing support elements to a spacing permitting said magnet board to be sandwiched therebetween, overlay parts being disposed in the shape of diagonal bracing at those inner corner parts in said base ends of said support elements which are formed by an upper end face of said leg portion and inner faces of the respective support elements; interposing said magnet board between both said support elements said magnet board being provided with a mounting hole; and causing the resin material to shrink, to snugly fit said mounting arbors into said mounting hole of the interposed magnet board and to sandwich and fix said magnet board between said support elements.

2. A method for manufacturing a door catch made of a synthetic resin according to claim 1, wherein said each support is substantially in the shape of a semisphere in which the base end part continuous to said leg portion is thinner than a central part of the support.

3. A method for manufacturing a door catch made of a synthetic resin according to claim 1, wherein an inner end face of said each mounting arbor is inclined so as to outwardly expand upwards.

4. A method for manufacturing a door catch made of a synthetic resin according to claim 1, wherein said magnet board comprises a magnet, and metal plates made of a magnetic substance, having the same shape as that of said magnet and attracted on both sides of said magnet.

* * * * *